G. P. ROUX.
POLYPLEX TERMINAL FOR ELECTRICAL LIGHT AND POWER CABLES.
APPLICATION FILED SEPT. 27, 1912.
1,235,926.
Patented Aug. 7, 1917.
4 SHEETS—SHEET 1.
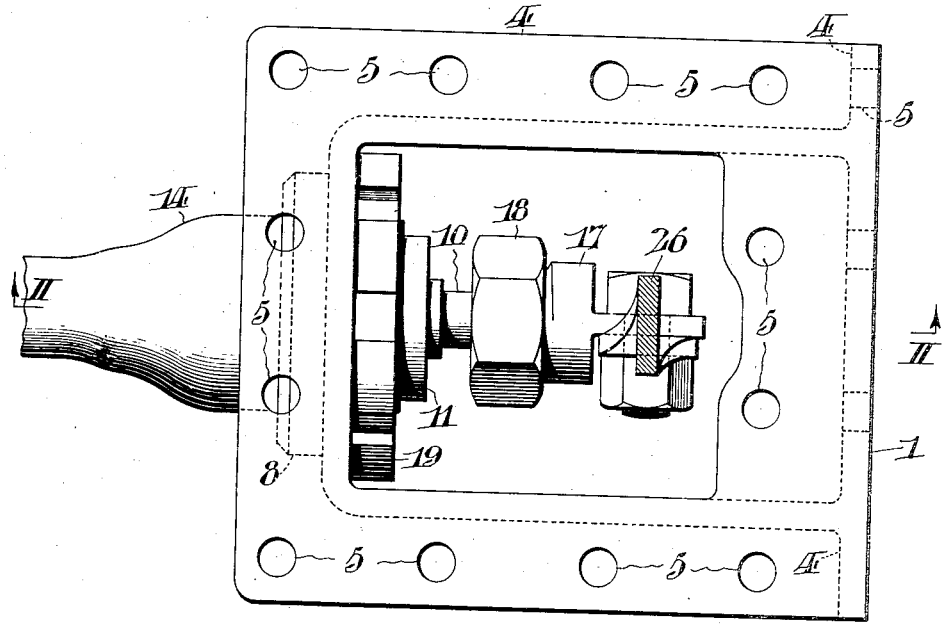
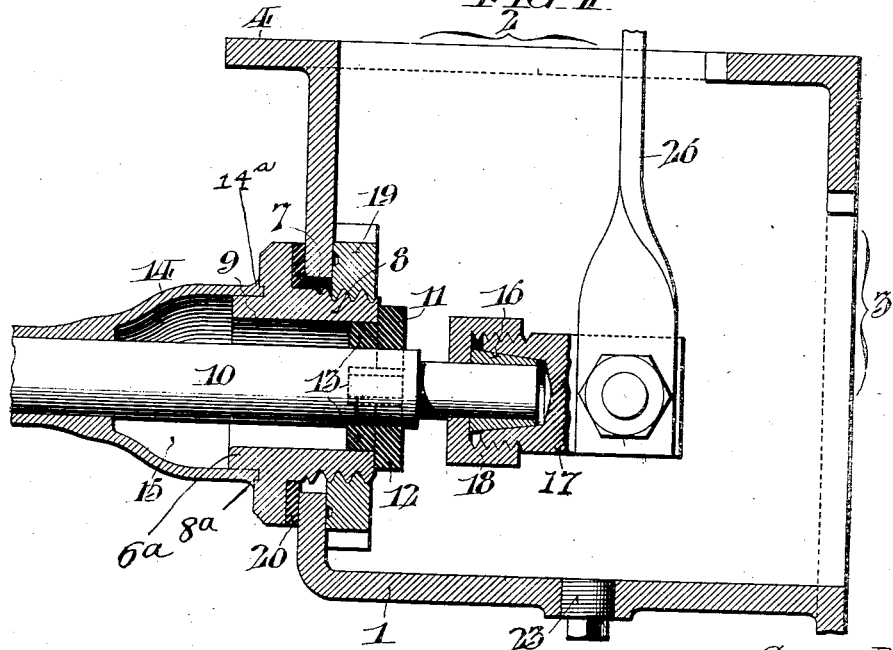

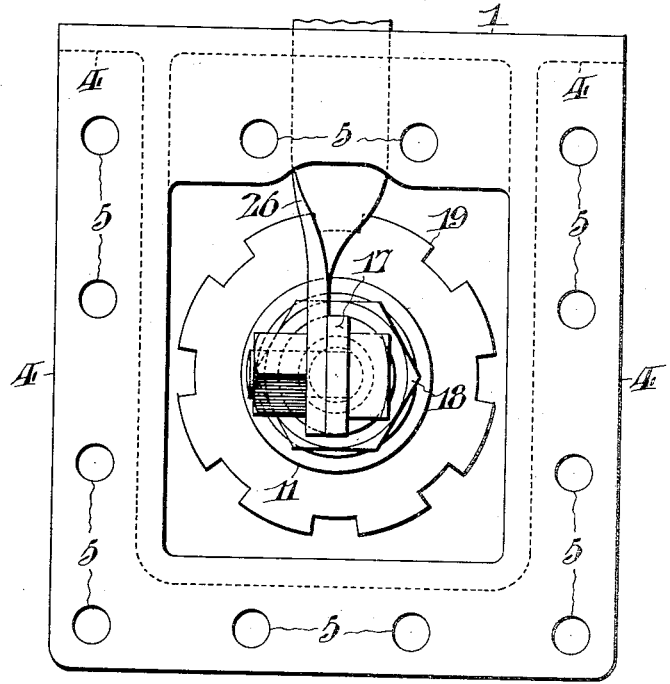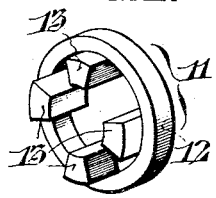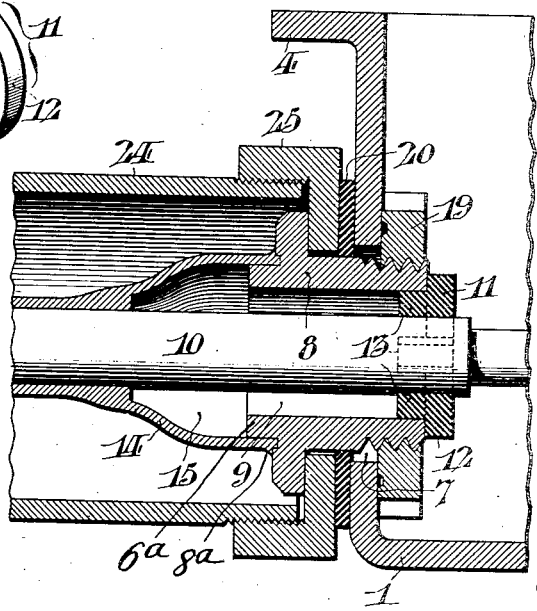

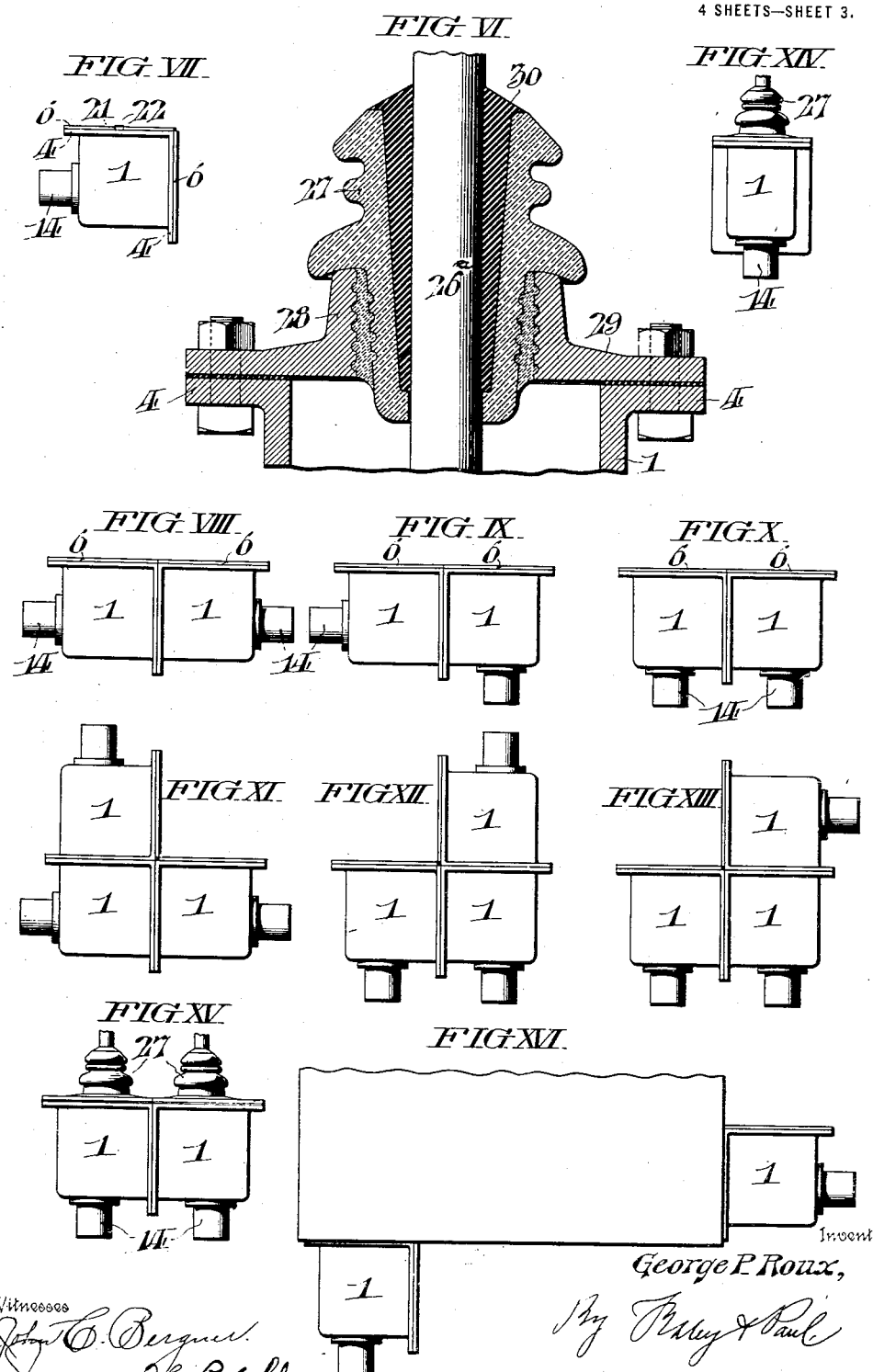

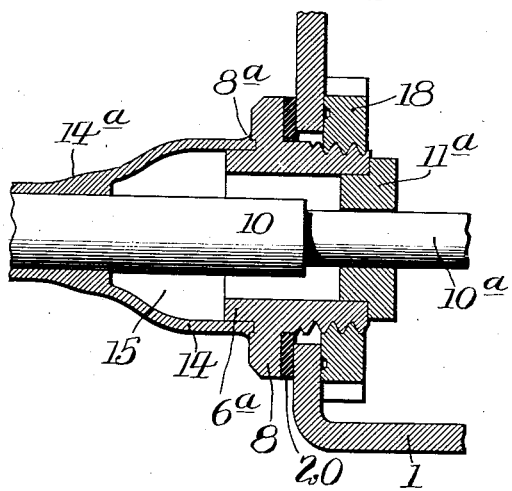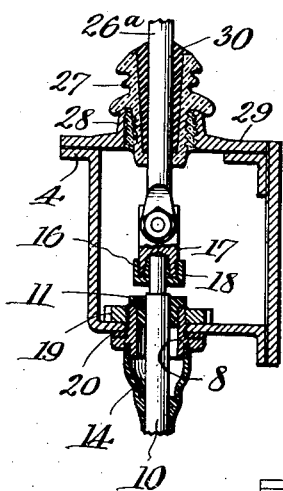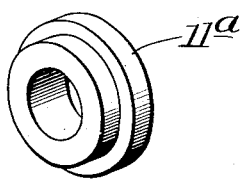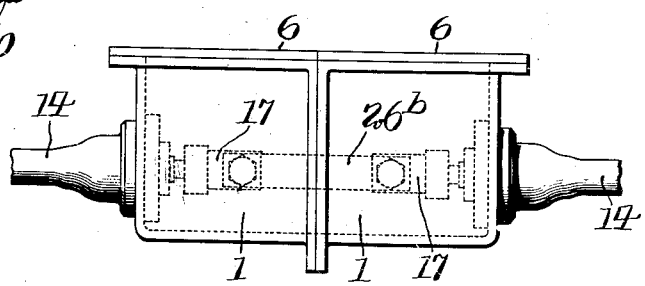

UNITED STATES PATENT OFFICE.

GEORGE P. ROUX, OF PHILADELPHIA, PENNSYLVANIA.

POLYPLEX TERMINAL FOR ELECTRICAL LIGHT AND POWER CABLES.

1,235,926. Specification of Letters Patent. Patented Aug. 7, 1917.

Application filed September 27, 1912. Serial No. 722,564.

*To all whom it may concern:*

Be it known that I, GEORGE P. ROUX, a citizen of the Republic of France, and a resident of Philadelphia, in the county of Philadelphia and State of Pennsylvania, have invented certain new and useful Improvements in Polyplex Terminals for Electrical Light and Power Cables, whereof the following is a specification, reference being had to the accompanying drawings.

The invention relates more particularly to terminals used in connection with insulated cables which it may be desired to dead end, or which it may be desired to connect to another cable, or cables, and wherein it is desired to protect the end of the cable from moisture.

An object of the invention is to provide a terminal box which is so constructed that the cable may be passed into the box through a suitable stuffing box and said terminal box filled with a moisture insulating material which thoroughly surrounds the end of the cable.

A further object of the invention is to provide a terminal box for an insulated cable, which is so constructed that it may be readily secured to a similar terminal box, and said boxes arranged in various relations to each other, so as to provide for joining the ends of cables extending either in the same direction, or at angles to each other.

A further object of the invention is to provide a terminal box for an insulated cable which is so constructed that it may be readily attached to a junction box, or which is so constructed that it may be used as a junction box and branch tap.

These and other objects will in part be obvious, and will in part be hereinafter fully described.

In the drawings, Figure I, is a plan view of a terminal box embodying the improvements and showing a cable connected therewith.

Fig. II, is a sectional view on the line II, II, of Fig. I.

Fig. III, is an end view of the terminal box shown in Fig. I.

Fig. IV, is a view similar to Fig. II, showing the attachment of a protecting pipe for a cable to the stuffing box.

Fig. V, is a detail in perspective showing an insulating bushing for holding the cable centrally of the stuffing box.

Fig. VI, is a detail in section, showing a lead or tap connection to the cable end in the terminal box.

Fig. VII, is a side view on a small scale of a terminal box used as a dead end terminal.

Fig. VIII, is a view showing two terminal boxes secured together for joining two cables extending in the same direction.

Fig. IX, is a side view of two terminal boxes secured together so as to join cables extending at right angles to each other.

Fig. X, is a side view of two terminal boxes for joining two cables leading in from the same direction, forming U-shaped terminals.

Fig. XI, is a view showing three terminal boxes secured together for joining three cables, two of which run in the same direction, and the other at an angle thereto.

Fig. XII, is a view showing three terminal boxes secured together for joining three cables, all of which extend in the same general direction.

Fig. XIII, is a view showing three terminal boxes for connecting two cables leading in from the same direction, and a cable at right angles thereto.

Fig. XIV, is a view showing a single terminal box with a tap leading therefrom, similar to that shown in Fig. VI.

Fig. XV, shows two terminal boxes similar to that shown in Fig. XIV, secured together.

Fig. XVI, shows a junction box with two terminal boxes secured thereto, having cables leading into the junction box at an angle thereto.

Fig. XVII is a view through the stuffing box similar to Fig. II, showing a slightly modified form of the invention;

Fig. XVIII is a perspective view of a slightly modified form of bushing;

Fig. XIX is an enlarged view similar to Fig. VIII, showing in dotted lines the connection between the conductors.

Fig. XX is a sectional view through the stuffing box arranged as shown in original Fig. XIV.

In carrying out the invention, a terminal box is provided, which is preferably open on two adjacent sides, which open sides are provided with flanges similarly shaped, and provided with openings through which bolts may be inserted for joining two terminal boxes together, or for securing a cover or lid to the terminal box for closing the same, when it is desired to dead end a conductor. Said terminal box further consists of a stuffing box, which is secured in a suitable opening formed in one of the remaining sides of the box, through which stuffing box the cable passes to the interior of the terminal box. This stuffing box is preferably formed so that the lead covering of the cable may be secured thereto by the aid of a suitable lead thimble attached to the stuffing box, by "wiping" the lead or otherwise, and said cable is held concentric with the opening through the stuffing box by a suitable insulating bushing. The inner end of the cable is made bare, and is suitably secured to a lug which may be utilized in connecting the cable to another cable in a terminal box attached to the first named terminal box, or which may be utilized in connecting the cable to a tap leading from the terminal box.

Referring more in detail to the drawings, the improved terminal box 1, is preferably made of cast iron or steel, although other suitable material may be used. This terminal box is formed with open sides 2, and 3, which open sides are adjacent each other and lie in planes at right angles to each other. Surrounding each side opening is a projecting flange 4, which is provided with suitable openings 5. The two open sides of the terminal box are of the same size, and the openings in the flanges are so formed that when the open side 2, of one box is placed in contact with the open side 3, of another terminal box, the openings 5, through the flanges will register so that one terminal box may be tightly secured to another, and if a suitable packing is used, a water-tight joint provided between the two connected terminal boxes.

A suitable lid or cover 6, may be provided for closing either of the open sides 2, and 3, and said lid or cover is formed with openings, so that the same may be bolted to the flange of the terminal box, (see Fig. VII). Likewise, with this lid or cover a suitable packing may be used so as to form a water-tight joint. The cable enters the terminal box through an opening 7, formed in one of the other sides of the box. Said opening is adapted to receive a stuffing box 8, which is formed with a central opening 9. A cable 10, extends through the stuffing box and is held concentric with the opening 9, therein by an insulating bushing 11, which is adapted to fit snugly about the outer surface of the cable, as shown in Fig. II. This insulating bushing is preferably formed with an annular part 12, see Fig. V, and with laterally spaced longitudinally extending parts 13. The spaces between the parts 13, form openings which connect the interior of the terminal box with the outer face of the insulating bushing, and the stuffing box 8.

The cable is connected to the stuffing box by a lead thimble 14, extending over a projecting ledge 6ª on the stuffing box, and a wipe joint 8ª is formed, which connects said thimble to the stuffing box. The thimble is also connected to the lead cover of the cable by a suitable wipe joint 14ª. This thimble 14, forms a chamber 15, about the insulation of the cable. The cable at its inner end is sweated into a conical sleeve 16, which engages a similar conical shaped recess in a lug 17. A gland 18, is threaded on to the lug 17, and engages the conical sleeve 16, so as to firmly hold the same seated in said conical recess in the lug.

The stuffing box is held to the terminal box by a lock nut 19, and a gasket 20, makes a tight joint between the stuffing box and the terminal box.

To dead end a conductor, the cable is passed through the stuffing box into the terminal box and a lid or cover 6, secured to each open face of the terminal box. The lid or cover is provided with an opening 21, which may be closed by a suitable tap plug 22, (see Fig. VII). The terminal box is then filled with an insulating compound through the opening in the lid or cover, after which said opening is closed. This compound will pass from the terminal box through the spaces formed in the insulating bushing 11, to the chamber 15, in the stuffing box, so that the end of the cable, where it is connected to the stuffing box, and within the terminal box, will be completely surrounded with said insulating compound. This insulating compound may be drawn from the terminal box by removing a plug 23, threaded into the bottom of the box. It will thus be seen that a terminal box is provided which may be used to dead end a conductor, which will prevent moisture from entering into the insulating material and impairing the insulation of the conductor.

With a rubber insulated cable, or cable having an insulation impervious to moisture, the insulating bushing 11, above described is made plain, as indicated at 11ª, Fig. XVIII, that is, without the spaces which permitted the insulating compound to pass through the bushing. In such cases the bushing will be made to snugly fit the cable over its insulation, leaving only sufficient space as a vent so that the insulating compound can be poured into the chamber 15, through a hole punched in the lead nipple or thimble 14, which hole is then plugged with lead and then wiped. In such instances, the filling of the terminal box with an insulating compound is not necessary.

Then again, with a cable wherein the insulation slightly absorbs moisture, said cable may be connected to the terminal box substantially in the same manner above described, except that the insulation is severed from the conductor some distance back of the insulating bushing, as indicated at 10ª, and said bushing 11ª made with a hole therein which fits the cable. The moisture insulating compound entering the chamber 15, will also surround and saturate the end of the insulation and prevent any moisture entering thereinto.

Beside using the terminal box for armored cable, it may also be used in connection with a conduit pipe into which the conductor is drawn. In Fig. IV, is shown such a pipe 24, and said pipe is secured to the terminal box by means of a threaded gland 25, the inwardly projecting flange of which extends within the projecting flange of the stuffing box and is clamped by said flange of the stuffing box against the gasket 20.

In the use of the terminal box for joining one cable to another, the lugs 17, are formed so that a connecting bar 26, may be clamped thereto and used for connecting the lug on one conductor to that on another. In Fig. VII, of the drawings is shown a terminal box used for a dead end conductor, in which case the open sides of the box are closed by the lids or covers 6. In Fig. VIII are shown two terminal boxes which are connected so as to join the ends of two conductors extending substantially in the same direction. One conductor passes into one terminal box at one side thereof, while the other conductor passes into the other terminal box at the opposite side thereof. The two open faces of the boxes which are opposite the stuffing boxes are joined together as above described, and the remaining open faces are covered by the lids or covers above referred to. The lugs 17 are joined by a suitable connection 26ᵇ, see Fig. XIX. In Fig. IX, the terminal boxes are shown arranged so as to join two conductors extending at substantially right angles to each other, while in Fig. X, the boxes are shown arranged so as to join two cables extending in the same direction, and located adjacent each other. In Figs. XI, to XIII, three terminal boxes are shown joined together for connecting three conductors or cables arranged in various angular relation to each other.

The improved terminal box above described may also be used as an end bell or pot head. In this use of the terminal box, the conductor enters said box through its lower wall, as shown in Figs. XIV and XX, and is dead ended, as above explained. A lead 26ª, is connected to the lug 17, by a suitable bolt, and this lead passes through an insulator 27, cemented into a nipple 28, formed in the cover 29, which is attached to the terminal box by suitable bolts. The central hole or opening in the insulator 27, is conical, and is filled with an insulating compound 30, which seals the same, thus preventing moisture from entering through the insulator 27, into the terminal box. This insulator can, of course, be made of any desired shape and size, and also of suitable material to suit any conditions as to voltage and size of the conductor.

In Fig. XIV, and in Fig. XX is shown a terminal box of the above construction. In Fig. XV, is shown two terminal boxes of the above construction which are joined together.

From the above description it will be apparent that the terminal box can be attached to a junction box, as shown in Fig. XVI, so that cables or conductors may be led into said junction box from various directions. It will be apparent that the terminal box can be used for connecting cables together and thus avoiding splicing or jointing, or said terminal box may be used to make a sharp turn in any direction in the run of the cable. Furthermore, said terminal box may be used to connect together several conductors at a center of distribution, and for any sized wire or cable, whether single, duplex, triplex or quadruplex conductor. In connection with a multiple conductor cable the formation of the pot head is similar to that for a single conductor, except that instead of one insulator 27, in the cover, said cover is provided with a plurality of nipples and insulators to suit the number of connections.

It is obvious that minor changes in the details of construction and the arrangement of parts may be made without departing from the spirit of the invention, as set forth in the appended claims.

Having thus described my invention, I claim:

1. A terminal box for electrical conductors comprising a casing having an opening in one of its sides and a stuffing box for said opening, through which a cable may be passed into said casing, a thimble connecting said stuffing box to said cable and forming a chamber adjacent the end of the conductor, a cover for said terminal box and means whereby said terminal box may be filled with a moisture-proof and insulating compound, said stuffing box having means for holding the cable centrally in said opening, said holding means being so constructed as to permit said compound to pass therethrough into the chamber formed by the thimble which connects the conductor to the stuffing box.

2. A terminal box for electrical conductors comprising a casing having an opening in one of its sides and a stuffing box for said opening, through which a cable may be passed to said casing, said stuffing box having a central opening therein and an insulating bushing for holding said cable centrally in said opening, said bushing having slots formed therethrough leading to the outer face thereof, a connecting nipple for joining said cable to said stuffing box and forming a chamber about the end of the cable, and means whereby said terminal box and said chamber may be filled with a moisture-proof and insulating compound.

3. A terminal box for electrical conductors, comprising a casing having an opening at one of its sides for a stuffing box, said casing having two open adjacent faces of substantially the same size, and projecting flanges extending about said open faces and having correspondingly arranged openings, whereby two terminal boxes may be joined together in various angular relations to each other, and a cover or lid for closing the remaining open sides.

4. A terminal box for electrical conductors, comprising a casing, having two open adjacent sides, means whereby two or more of said casings may be attached together with said open sides facing each other, means for covering the remaining open sides, said casing having an opening in one of its sides, and a stuffing box for said opening, through which a cable may be passed into said casing.

5. A terminal box for electrical conductors, comprising a casing, having two open adjacent sides, means whereby two or more of said casings may be attached together with said open sides facing each other, means for covering the remaining open sides, said casing having an opening in one of its sides, and a stuffing box for said opening, through which a cable may be passed into said casing, said stuffing box having a central opening therein, and an insulating bushing for holding the cable centrally of said opening.

6. A terminal box for electrical conductors, comprising a casing having an opening in one of its walls, a stuffing box for said opening, through which a cable may be passed into said casing, a removable cover having a nipple formed therein, an insulator secured in said nipple, through which a lead extends to said casing, a lug secured to the end of the conductor and attached to said lead, said stuffing box having a central opening therethrough and an insulating bushing adapted to engage said cable and hold the same centrally of said opening.

In testimony whereof, I have hereunto signed my name at Philadelphia, Pennsylvania, this twenty-fifth day of September, 1912.

GEORGE P. ROUX.

Witnesses:
JAMES H. BELL,
E. L. FULLERTON.